United States Patent
Chang et al.

(10) Patent No.: US 9,544,461 B2
(45) Date of Patent: Jan. 10, 2017

(54) DEVICE FOR ACQUIRING IMAGE OF SLICE MEDIUM

(71) Applicant: GRG Banking Equipment Co., Ltd., Guangzhou, Guangdong (CN)

(72) Inventors: Yang Chang, Guangdong (CN); Zhiqiang Sun, Guangdong (CN); Zhuang Jiang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/917,139

(22) PCT Filed: Nov. 24, 2014

(86) PCT No.: PCT/CN2014/092004
§ 371 (c)(1),
(2) Date: Mar. 7, 2016

(87) PCT Pub. No.: WO2015/149528
PCT Pub. Date: Oct. 8, 2015

(65) Prior Publication Data
US 2016/0212292 A1    Jul. 21, 2016

(30) Foreign Application Priority Data
Apr. 2, 2014    (CN) .......................... 2014 1 0131997

(51) Int. Cl.
*G06F 15/00*     (2006.01)
*H04N 1/04*      (2006.01)
(Continued)

(52) U.S. Cl.
CPC ................ *H04N 1/04* (2013.01); *B65H 5/062* (2013.01); *B65H 7/02* (2013.01); *G07D 7/04* (2013.01);
(Continued)

(58) Field of Classification Search
USPC ....................................................... 358/1.12
See application file for complete search history.

(56) References Cited

U.S. PATENT DOCUMENTS

| 4,269,274 A | 5/1981 | Robertson et al. |
| 5,034,616 A | 7/1991 | Bercovitz |

(Continued)

FOREIGN PATENT DOCUMENTS

| CN | 1950856 A | 4/2007 |
| CN | 200986719 Y | 12/2007 |

(Continued)

OTHER PUBLICATIONS

International Search Report for PCT/CN2004/092004, mailed Jan. 28, 2015, ISA/CN.

(Continued)

*Primary Examiner* — Saeid Ebrahimi Dehkord
(74) *Attorney, Agent, or Firm* — U.S. Fairsky LLP; Yue Xu

(57) ABSTRACT

An image acquiring device for a sheet-type medium includes an upper passage plate and a lower passage plate, a gap being reserved between the upper passage plate and the lower passage plate to form a passage; at least two driving wheels mounted on the lower passage plate, and configured to drive the sheet-type medium entered into the passage to advance along the direction of the passage; at least two floating pinch rollers mounted on the upper passage plate, and each being mounted cooperatively with a respective driving wheel and being tangent to the driving wheel at a tangential point, and being configured to apply a pressure to the sheet-type medium to allow the sheet-type medium to cling to the driving wheel; and an image collecting device, (Continued)

mounted between two sets of the driving wheels and the floating pinch rollers, and configured to collect an image of the sheet-type medium.

10 Claims, 4 Drawing Sheets

(51) Int. Cl.
| | | |
|---|---|---|
| *G07D 7/04* | (2016.01) | |
| *G07D 7/12* | (2016.01) | |
| *G07D 7/16* | (2016.01) | |
| *B65H 5/06* | (2006.01) | |
| *B65H 7/02* | (2006.01) | |
| *H04N 1/00* | (2006.01) | |
| *H04N 1/12* | (2006.01) | |
| *H04N 1/48* | (2006.01) | |

(52) U.S. Cl.
CPC ............... *G07D 7/12* (2013.01); *G07D 7/164* (2013.01); *H04N 1/00702* (2013.01); *H04N 1/00716* (2013.01); *H04N 1/00724* (2013.01); *H04N 1/00732* (2013.01); *H04N 1/12* (2013.01); *H04N 1/48* (2013.01); *B65H 2403/20* (2013.01); *B65H 2701/1912* (2013.01); *H04N 2201/0081* (2013.01); *H04N 2201/04756* (2013.01)

(56) References Cited

U.S. PATENT DOCUMENTS

| | | | |
|---|---|---|---|
| 5,465,821 A | 11/1995 | Akioka | |
| 6,170,820 B1 * | 1/2001 | Hutson | B65H 5/062 198/502.1 |
| 2010/0104170 A1 | 4/2010 | Joshi | |
| 2012/0279096 A1 | 11/2012 | Skjaeveland | |
| 2014/0063573 A1 | 3/2014 | Yonemura et al. | |
| 2014/0071503 A1 | 3/2014 | Mukai et al. | |

FOREIGN PATENT DOCUMENTS

| | | |
|---|---|---|
| CN | 201820288 U | 5/2011 |
| CN | 102096961 A | 6/2011 |
| CN | 102142165 A | 8/2011 |
| CN | 203212056 U | 9/2013 |
| CN | 103413374 A | 11/2013 |
| CN | 103662890 A | 3/2014 |
| CN | 103685835 A | 3/2014 |
| CN | 203616806 U | 5/2014 |
| CN | 103879806 A | 6/2014 |
| JP | 5-147765 A | 6/1993 |
| JP | 2005-350162 A | 12/2005 |

OTHER PUBLICATIONS

Australian First Office Action for AU2014389085, mailed Aug. 9, 2016.

* cited by examiner

DEVICE FOR ACQUIRING IMAGE OF SLICE MEDIUM

This application is the national phase of International Application No. PCT/CN2014/092004, titled "DEVICE FOR ACQUIRING IMAGE OF SLICE MEDIUM", filed on Nov. 24, 2014, which claims the benefit of priority to Chinese Patent Application No. 201410131997.4 titled "IMAGE ACQUIRING DEVICE FOR SHEET-TYPE MEDIUM", filed with the Chinese State Intellectual Property Office on Apr. 2, 2014, the entire disclosures of both applications are incorporated herein by reference.

FIELD

The present application relates to the field of financial service apparatus, and particularly to an image acquiring device for a sheet-type medium.

BACKGROUND

With the development of society, financial service has played a very important role in people's daily life; hence the image acquisition of paper currencies is an indispensable important technique in the financial service field.

Currently, a common manner for acquiring an image of a paper currency is to use an image collecting sensor to scan the paper currency to acquire an image of the paper currency while the paper currency is driven by a driving wheel.

However, in a conventional image collecting device, the sheet-type medium may float greatly when being conveyed at a high speed, and the floating may cause a large change in a gray scale value of a collected image, and the image with the inaccurate gray scale value is adverse to the analysis processing after the acquisition process.

SUMMARY

An image acquiring device for a sheet-type medium is provided according to the present application, which enables the sheet-type medium to be always in the same plane in the process of being conveyed in a passage, to prevent the sheet-type medium from floating greatly, thereby avoiding the change in a gray scale value of a collected image caused by the floating, and ensuring that the gray scale value of the collected image may not affect the analysis processing.

The image acquiring device for the sheet-type medium according to the present application, includes:

an upper passage plate, mounted cooperatively with a lower passage plate, with a gap being reserved between the upper passage plate and the lower passage plate to form a passage;

the lower passage plate, mounted cooperatively with the upper passage plate, with the gap being reserved between the lower passage plate and the upper passage plate to form the passage;

a driving wheel, with at least two driving wheels mounted on the lower passage plate, and the driving wheels being configured to drive the sheet-type medium entered into the passage to advance along the direction of the passage;

a floating pinch roller, with at least two floating pinch rollers mounted on the upper passage plate, and each of the floating pinch rollers being mounted cooperatively with a respective driving wheel and being tangent to the driving wheel at a tangential point, and being configured to apply a pressure to the sheet-type medium to allow the sheet-type medium to cling to the driving wheel, and an image collecting device, mounted between two sets of the driving wheels and the floating pinch rollers, and configured to collect an image of the sheet-type medium in a process of the sheet-type medium passing through the passage;

wherein all tangential points are located in the passage, and are located in a plane in parallel with an advance direction of the passage.

Optionally, the image acquiring device for the sheet-type medium further includes a transparent strip mounted between two sets of the driving wheels and the floating pinch rollers to cooperate with the image collecting device, and configured to allow the image collecting device to collect the image of the sheet-type medium by transmission collecting.

Optionally, a surface of a transmission position of the image collecting device is in a plane where the tangential points are located, and an upper surface of the transparent strip is in the same plane as a surface of the upper passage plate or a surface of the lower passage plate;

or, the upper surface of the transparent strip is in the plane where the tangential points are located, and the surface of the transmission position of the image collecting device is in the same plane as the surface of the upper passage plate or the surface of the lower passage plate.

Optionally, at least three sets of the driving wheels and the floating pinch rollers are provided and include a set A1, a set A2, and a set A3;

at least two sets of the image collecting devices and the transparent strips are provided and include a set B1, and a set B2; and the set A1, the set B1, the set A2, the set B2, and the set A3 are arranged in the listed sequence in the advance direction of the passage.

Optionally, a vertical distance between the surface of the transmission position of the image collecting device and the plane where the tangential points are located is in a preset distance interval;

the distance interval is obtained according to a distance-gray scale value curve and a change interval of a gray scale value;

the distance-gray scale value curve records a corresponding relationship between a gray scale value of a collected image and a distance from the surface of the transmission position of the image collecting device to a surface of the sheet-type medium; and the change interval of the gray scale value is a change range of the gray scale value of the image within which the analysis processing is not affected.

Optionally, the image acquiring device for the sheet-type medium further includes a synchronous belt, mounted on the driving wheels and configured to drive the driving wheels to rotate at the same rotational speed.

Optionally, the image acquiring device for the sheet-type medium further includes a magnetic sensor mounted on the lower passage plate, having a sensing surface located in a plane where the tangential points are located, and configured to sense a change of position of the sheet-type medium and generate a corresponding electrical signal.

Optionally, the sensing surface is tangent to lower ends of a plurality of floating pinch rollers.

Optionally, the image acquiring device for the sheet-type medium further includes a thickness sensing device mounted on the upper passage plate and the lower passage plate, and located at a tail end of the passage in the advance direction of the passage, and configured to measure a thickness of the sheet-type medium.

Optionally, a plurality of sets of the driving wheels and the floating pinch rollers are provided in the thickness sensing device; and the sheet-type medium is configured to pass through the thickness sensing device at a position between the plurality of sets of the driving wheels and the floating pinch rollers.

According to the above technical solutions, the embodiments of the present application have the following advantages.

In the embodiments of the present application, the image acquiring device for the sheet-type medium described above includes the upper passage plate mounted cooperatively with the lower passage plate with the gap being reserved between the upper passage plate and the lower passage plate to form the passage; the lower passage plate mounted cooperatively with the upper passage plate with the gap being reserved between the lower passage plate and the upper passage plate to form the passage; the driving wheel, with at least two driving wheels being mounted on the lower passage plate, configured to drive the sheet-type medium entered into the passage to advance along the direction of the passage; the floating pinch roller, with at least two floating pinch rollers mounted on the upper passage plate, each of the floating pinch rollers being mounted cooperatively with the respective driving wheel and being tangent to the driving wheel at the tangential point, and configured to apply a pressure to the sheet-type medium to allow the sheet-type medium to cling to the driving wheel; and the image collecting device mounted between two sets of the driving wheels and the floating pinch rollers, and configured to collect an image of the sheet-type medium while the sheet-type medium passes through the passage. All the tangential points are located in the passage, and are located in the plane in parallel with the advance direction of the passage. In the embodiments of the present application, all the tangential points of the driving wheels and the floating pinch rollers are located in the plane in parallel with the advance direction of the passage, to enable the sheet-type medium to be always in the same plane in the process of being conveyed in the passage, prevent the sheet-type medium from floating greatly, thereby avoiding the change in a gray scale value of a collected image caused by the floating, and ensuring that the gray scale value of the collected image may not affect the analysis processing.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some embodiments of the present application, and for the person skilled in the art, other drawings may be obtained based on these drawings without any creative efforts.

DETAILED DESCRIPTION

An image acquiring device for a sheet-type medium is provided according to the present application, which is configured to allow the sheet-type medium to be always in the same plane in the process of being conveyed in a passage, to prevent the sheet-type medium from floating greatly, thereby avoiding the change in a gray scale value of a collected image caused by the floating, and ensuring that the gray scale value of the collected image may not affect the analysis processing.

For making the objects, features and advantages of the present application clearer and easier to be understood, the technical solutions according to embodiments of the present application are described clearly and completely hereinafter in conjunction with the drawings in the embodiments of the present application. Apparently, the embodiments described hereinafter are only a part of the embodiments of the present application, rather than all embodiments. Based on the embodiments in the present application, all of other embodiments, made by the person skilled in the art without any creative efforts, fall into the scope of the present application.

Figure 1:
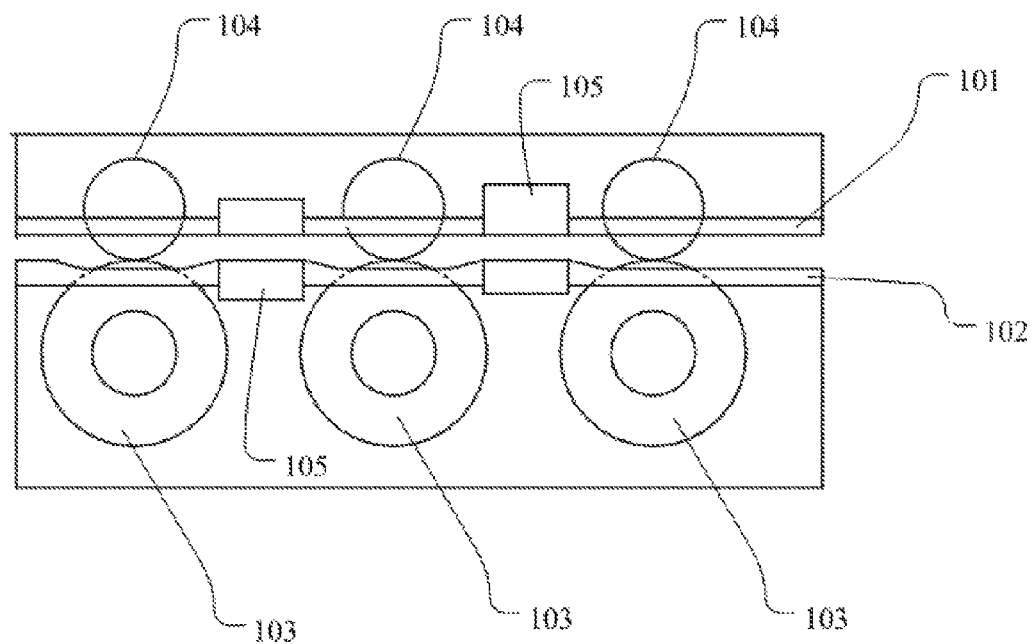
FIG. 1 is a schematic view showing the structure of an embodiment of an image acquiring device for a sheet-type medium according to the present application.

Referring to FIG. 1, an embodiment of the image acquiring device for the sheet-type medium according to the present application includes an upper passage plate 101, a lower passage plate 102, a driving wheel 103, a floating pinch roller 104, and an image collecting device 105.

The upper passage plate 101 is mounted cooperatively with the lower passage plate 102, with a gap being reserved between the upper passage plate 101 and the lower passage plate 102 to form a passage.

The lower passage plate 102 is mounted cooperatively with the upper passage plate 101, with the gap being reserved between the lower passage plate 102 and the upper passage plate 101 to form the passage.

At least two driving wheels 103 are mounted on the lower passage plate 102, and are configured to drive a sheet-type medium entered into the passage to advance along the direction of the passage.

At least two floating pinch rollers 104 are mounted on the upper passage plate 101. Each of the floating pinch rollers 104 is mounted cooperatively with a respective driving wheel 103 and is tangent to the driving wheel 103 at the tangential point, and is configured to apply a pressure to the sheet-type medium to allow the sheet-type medium to cling to the driving wheel 103.

The image collecting device 105 is mounted between two sets of the driving wheels 103 and the floating pinch rollers 104, and is configured to collect an image of the sheet-type medium while the sheet-type medium passes through the passage. It is to be noted that, one driving wheel 103 and one floating pinch roller 104 constitute one set, and the image collecting device 105 is located between two sets of the driving wheels 103 and the floating pinch rollers 104. However, the number of sets of the driving wheels 103 and the floating pinch rollers 104 is not limited to only two, for example, in the case that there are three sets of the driving wheels 103 and the floating pinch rollers 104, two image collecting devices 105 may be provided between each two adjacent sets of the three sets of the driving wheels 103 and the floating pinch rollers 104 respectively.

It is to be noted that, all the tangential points are located in the passage, and are located in a plane in parallel with an advance direction of the passage.

In this embodiment, the image acquiring device for the sheet-type medium described above includes the upper passage plate 101 mounted cooperatively with the lower passage plate 102 with the gap being reserved between the upper passage plate 101 and the lower passage plate 102 to form the passage; the lower passage plate 102 mounted cooperatively with the upper passage plate 101 with the gap being reserved between the lower passage plate 102 and the upper passage plate 101 to form the passage; the driving wheel 103, with at least two driving wheels 103 being mounted on the lower passage plate 102, configured to drive the sheet-type medium entered into the passage to advance along the direction of the passage; the floating pinch roller 104, with at least two floating pinch rollers 104 mounted on the upper passage plate 101, each of the floating pinch rollers 104 being mounted cooperatively with the respective driving wheel 103 and being tangent to the driving wheel 103 at the tangential point, and configured to apply a pressure to the sheet-type medium to allow the sheet-type medium to cling to the driving wheel 103; and the image collecting device 105 mounted between two sets of the driving wheels 103 and the floating pinch rollers 104, and configured to collect an image of the sheet-type medium while the sheet-type medium passes through the passage. All the tangential points are located in the passage, and are located in the plane in parallel with the advance direction of the passage. In this embodiment, the passage having a conveying function is formed by the upper passage plate 101, the lower passage plate 102, the driving wheels 103 and the floating pinch rollers 104. After the sheet-type medium enters into the passage, the sheet-type medium will be clamped by the driving wheels 103 and the floating pinch rollers 104 and be driven to advance, and while the sheet-type medium advances in the passage, the image collecting device 105 collects the image of the sheet-type medium. All the tangential points of the driving wheels 103 and the floating pinch rollers 104 are located in the plane in parallel with the advance direction of the passage, to enable the sheet-type medium to be always in the same plane in the process of being conveyed in the passage, prevent the sheet-type medium from floating greatly, thereby avoiding the change in a gray scale value of a collected image caused by the floating, and ensuring that the gray scale value of the collected image may not affect the analysis processing.

Figure 2:
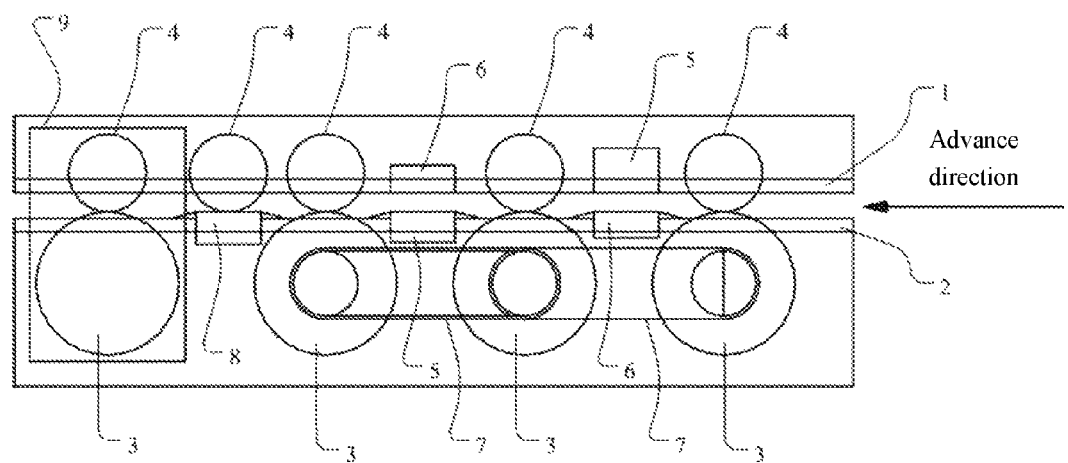
FIG. 2 is a schematic view showing the structure of another embodiment of the image acquiring device for the sheet-type medium according to the present application.

For ease of understanding, the image acquiring device for the sheet-type medium according to the present application is described in detail hereinafter. Referring to FIG. 2, another embodiment of the image acquiring device for the sheet-type medium according to the present application includes an upper passage plate 1, a lower passage plate 2, a driving wheel 3, a floating pinch roller 4, and an image collecting device 5.

The upper passage plate 1 is mounted cooperatively with the lower passage plate 2, with a gap being reserved between the upper passage plate 1 and the lower passage plate 2 to form a passage.

The lower passage plate 2 is mounted cooperatively with the upper passage plate 1, with the gap being reserved between the lower passage plate 2 and the upper passage plate 1 to form the passage.

At least two driving wheels 3 are mounted on the lower passage plate 2, and are configured to drive a sheet-type medium entered into the passage to advance along the direction of the passage.

At least two floating pinch rollers 4 are mounted on the upper passage plate 1. Each of the floating pinch rollers 4 is mounted cooperatively with a respective driving wheel 3 and is tangent to the driving wheel 3 at a tangential point, and is configured to apply a pressure to the sheet-type medium to allow the sheet-type medium to cling to the driving wheel 3.

The image collecting device 5 is mounted between two sets of the driving wheels 3 and the floating pinch rollers 4, and is configured to collect an image of the sheet-type medium while the sheet-type medium passes through the passage.

It is to be noted that, all the tangential points are located in the passage, and are located in a plane in parallel with an advance direction of the passage.

The image acquiring device for the sheet-type medium according to this embodiment may further include a transparent strip 6.

The transparent strip 6 is mounted between two sets of the driving wheels 3 and the floating pinch rollers 4 to cooperate with the image collecting device 5, and is configured to allow the image collecting device 5 to collect an image of the sheet-type medium by transmission collecting.

It is to be noted that, the surface of the transmission position of the image collecting device 5 is in the plane where the tangential points are located, and an upper surface of the transparent strip 6 is in the same plane as the surface of the upper passage plate 1 or the surface of the lower passage plate 2; or the upper surface of the transparent strip 6 is in the plane where the tangential points are located, and the surface of the transmission position of the image collecting device 5 is in the same plane as the surface of the upper passage plate 1 or the surface of the lower passage plate 2.

There are at least three sets of the driving wheels 3 and the floating pinch rollers 4, including a set A1, a set A2, and a set A3.

There are at least two sets of the image collecting devices 5 and the transparent strips 6, including a set B1, and a set B2.

Figure 6:
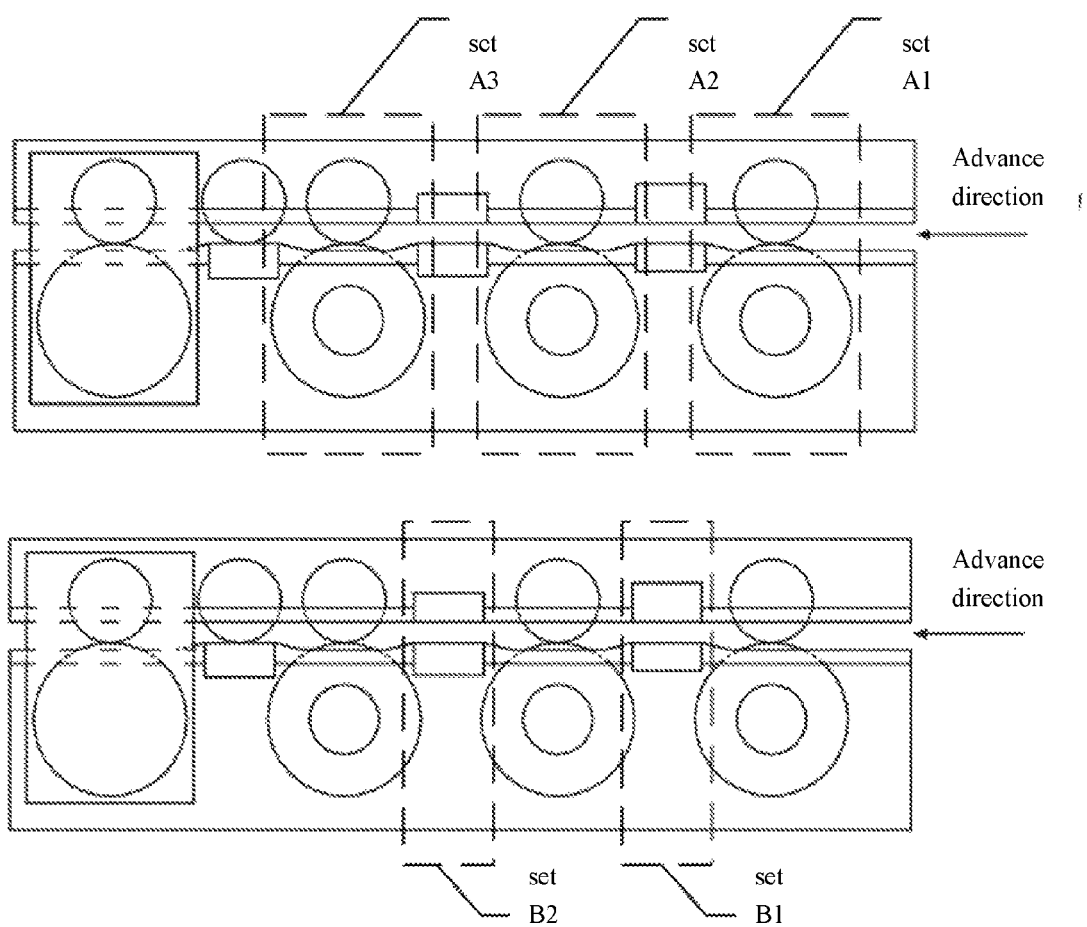
FIG. 6 is a schematic view showing the arrangement of a set A1, a set B1, a set A2, a set B2 and a set A3 in another embodiment of the image acquiring device for the sheet-type medium according to the present application.

The set A1, the set B1, the set A2, the set B2, and the set A3 are arranged in the listed sequence in the advance direction of the passage, as shown in FIG. 6.

Figure 3:
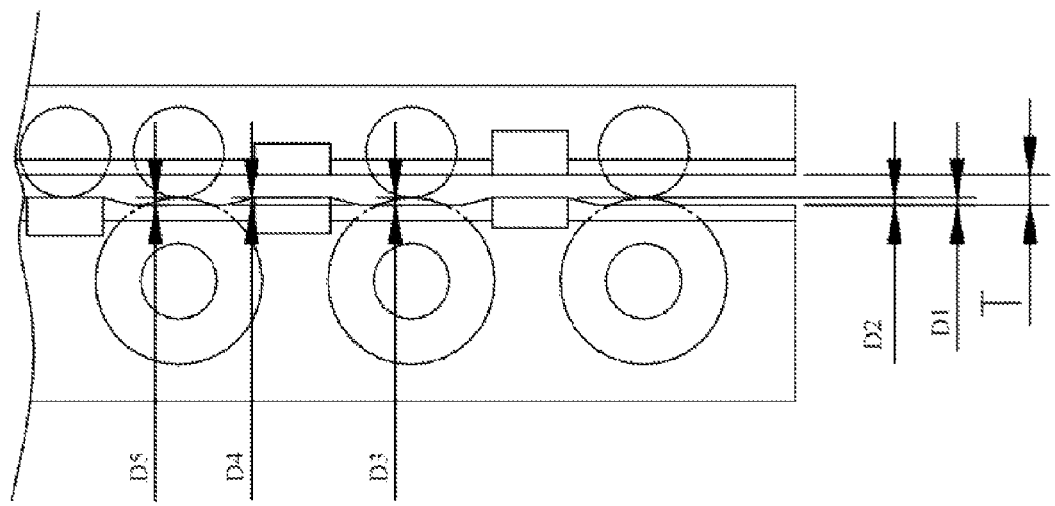
FIG. 3 is a schematic view showing the structure of another embodiment of the image acquiring device for the sheet-type medium according to the present application.

Assuming that the passage has a height of T, a distance between a tangential point in the set A1 and the lower passage plate 2 is D1, a distance between an upper surface of a transparent strip 6 in the set B1 and the lower passage plate 2 is D2, a distance between a tangential point in the set A2 and the lower passage plate 2 is D3, a distance between an upper surface of a transparent strip 6 in the set B2 and the lower passage plate 2 is D4, and a distance between a tangential point in the set A3 and the lower passage plate 2 is D5, it needs to satisfy the condition that D1=D2=D3=D4=D5, and reference is made to FIG. 3, in this case, the sheet-type medium may be kept to advance in the same plane in the passage.

It is to be noted that, the vertical distance between the surface of the transmission position of the image collecting device 5 and the plane where the tangential points are located is in a preset distance interval. The distance interval is obtained according to a distance-gray scale value curve and a change interval of the gray scale value. The distance-gray scale value curve records a corresponding relationship between the gray scale value of the collected image and the distance from the surface of the transmission position of the image collecting device 5 to the surface of the sheet-type medium. The change interval of the gray scale value is a range of the change of the gray scale value of the image within which the analysis processing is not affected.

The image acquiring device for the sheet-type medium according to this embodiment may further include a synchronous belt 7, a magnetic sensor 8, and a thickness sensing device 9.

The synchronous belt 7 is mounted on the driving wheels 3, and is configured to drive the driving wheels 3 to rotate at the same rotational speed.

The magnetic sensor 8 is mounted on the lower passage plate 2 and has a sensing surface located in the plane where the tangential points are located, and is configured to sense the change of position of the sheet-type medium and generate a corresponding electrical signal, and the sensing surface is tangent to lower ends of several floating pinch rollers 4.

The thickness sensing device 9 is mounted on the upper passage plate 1 and the lower passage plate 2, and is located at a tail end of the passage in the advance direction of the passage, and is configured to measure the thickness of the sheet-type medium.

It is to be noted that, the sheet-type medium passes through the thickness sensing device 9 at a position between several sets of the driving wheels 3 and the floating pinch rollers 4. The magnetic sensor 8 is generally mounted ahead of the thickness sensing device in a direction opposite to the advance direction of the passage, i.e., ahead of an entrance of the thickness sensing device, to allow the sheet-type medium to enter into the thickness sensing device after passing through the magnetic sensor 8.

The presence of the synchronous belt 7 allows all of the driving wheels 3 in the image acquiring device for the sheet-type medium to drive the sheet-type medium at the same rotational speed, thereby ensuring that the sheet-type medium is always maintained in the same plane during the process of advancing in the passage.

In this embodiment, the passage having a conveying function is formed by the upper passage plate 1, the lower passage plate 2, the driving wheels 3 and the floating pinch rollers 4. After the sheet-type medium enters into the passage, the sheet-type medium will be clamped by the driving wheels 3 and the floating pinch rollers 4 and be driven to advance, and while the sheet-type medium advances in the passage, the image collecting device 5 collects the image of the sheet-type medium. All the tangential points of the driving wheels 3 and the floating pinch rollers 4 are located in the plane in parallel with the advance direction of the passage, to enable the sheet-type medium to be always in the same plane in the process of being conveyed in the passage, prevent the sheet-type medium from floating greatly, thereby avoiding the change in a gray scale value of a collected image caused by the floating, and ensuring that the gray scale value of the collected image may not affect the analysis processing. Furthermore, the synchronous belt 7 can ensure that the sheet-type medium will not float due to inconsistence of the rotational speeds of the driving wheels 3 while the sheet-type medium advances in the passage, and the thickness sensing device 9 and the magnetic sensor 8 can respectively measure the thickness of the sheet-type medium and sense the position information of the sheet-type medium.

The limiting range of the vertical distance between the surface of the transmission position of the image collecting device and the plane where the tangential points are located will be explained and described in detail hereinafter, and reference is made to FIG. 4.

Figure 4:
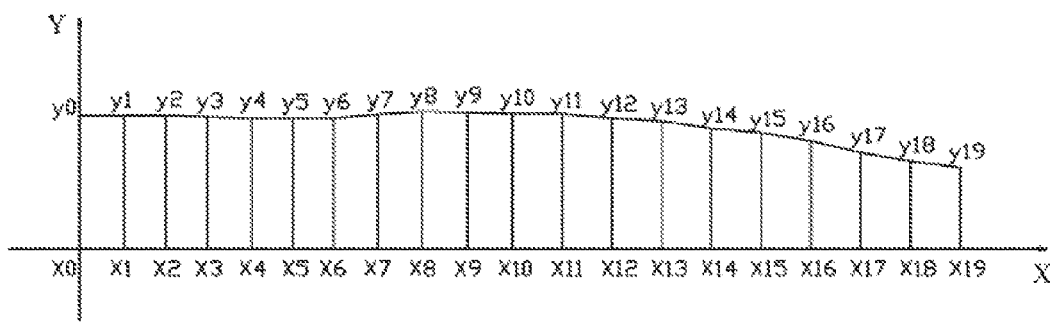
FIG. 4 is a schematic view showing a distance-gray scale value curve in an embodiment of the image acquiring device for the sheet-type medium.

The passage has a height of T, a distance between the lower passage plate and the tangential points of the driving wheels and the floating pinch rollers is D1, a distance between the surface of the transmission position of the image collecting device and the sheet-type medium is X, and the corresponding gray scale value of the image is Y, the distance-gray scale value curve may be obtained through multiple measurements, as shown in FIG. 4.

As illustrated in FIG. 4, it is assumed that when performing an analysis processing on a collected image, the required change interval of the gray scale value of the image ranges from y9 to y14, then the interval of X corresponding to the required change interval of the gray scale value ranges from X0 to X14. In the case that the sheet-type medium is conveyed in the same plane, the vertical distance between the surface of the transmission position of the image collecting device and the plane where the tangential points are located is equal to X, thus the interval of the vertical distance is [X0, X14]. Also, for the passage, T=X+D1, hence, T-D1 also falls into the interval of [X0, X14].

It is to be noted that, each of the values of X and Y in this embodiment is required to be obtained by measuring or calculating according to an actual situation in a practical application, and for different analysis processing, the required change interval of the gray scale value may also be different.

For easy of understanding, according to the embodiment depicted in FIG. 2, the image acquiring device for the sheet-type medium according to the embodiment of the present application is described hereinafter in a practical application scenario.

A: a paper currency enters into the passage in an advance direction.

Figure 5:
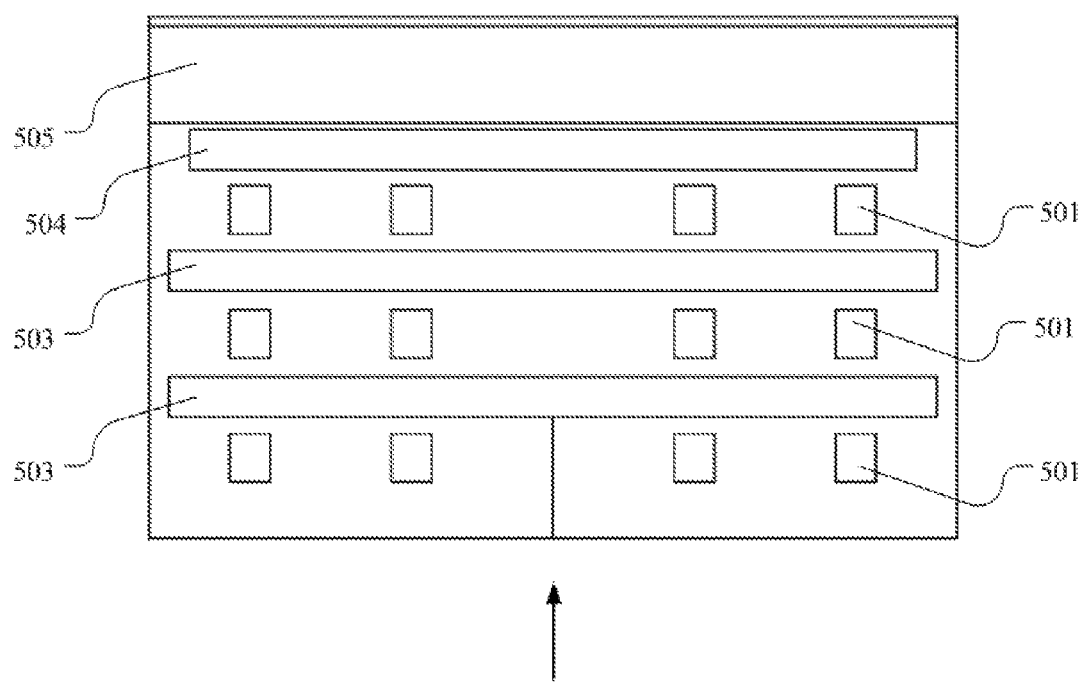
FIG. 5 is a bottom schematic view showing a bottom portion of the image acquiring device for the sheet-type medium according to an embodiment of the present application.

B: after the paper currency enters into the passage, the paper currency is firstly driven by the first group of the driving wheels 501 and the floating pinch rollers 502 to advance, and the first group includes four pairs of driving wheels 501 and floating pinch rollers 502 which are arranged in a direction perpendicular to the advance direction, as shown in FIG. 5, and the magnetic sensor 504 and the floating pinch rollers 502 are not shown in FIG. 5.

C: then the paper currency meets a set of the image collecting device 503 and the transparent strip, and a set of the driving wheels 501 and the floating pinch rollers 502 alternately during the process of advancing in the passage, and the paper currency is maintained in the same plane during the advancing process.

D: while the paper currency advances, the image collecting device 503 collects an image of the paper currency.

E: the paper currency will pass through the magnetic sensor when approaching the tail end of the passage, and the magnetic sensor may inform the image acquiring device for the sheet-type medium of the change of the position of the paper currency at that time.

F: then the paper currency enters into the thickness sensing device 505, a set of the driving wheel 501 and the floating pinch roller 502 are provided in the thickness sensing device 505, to allow the paper currency to enter the thickness sensing device 505 at an uniform speed and be maintained on the previous plane, and the thickness sensing device 505 detects the thickness of the paper currency.

G: the process for acquiring the image ends till the paper currency exits from the image acquiring device for the sheet-type medium.

It can be clearly understood by the person skilled in the art that, for convenience and concise of the description, the specific working process of the system, device, and unit described above may refer to the corresponding process in the embodiment of the method described above, which will not be described herein again.

In the several embodiments provided by the present application, it should be appreciated that, the system, the device and the method disclosed herein may be implemented in other manners. For example, the embodiments of the device described above are only schematic. For example, the division of the units is only a division on logical function, and there may be other division modes in the practical implementation, for instance, multiple units or components may be combined, or may be integrated into another system; and some features may be omitted or unperformed. In addition, the coupling, direct coupling or communication connection between the components displayed or discussed above may be realized by some interfaces. The indirect coupling or communication connection between the devices or units may be electrical, mechanical or other forms.

The above unit described as a separate component may be or may be not separate physically. The component displayed as a unit may be or may be not a physical unit, that is, may be located at one place or may be distributed on multiple network units. The object of the solution of the embodiment may be achieved by selecting a part or all of the units according to the practical needs.

Furthermore, various function units in the embodiments of the present application may be integrated in one processing unit; or, each of the function units may be a single physical presence; or two or more function units are integrated in one unit. The above integrated unit may be realized in a form of hardware or in a form of software function unit.

In the case that the integrated unit is implemented in the form of software functional unit and is sold or used as a separate product, it can also be stored in a computer readable storage medium. Based on such understanding, the essence or the part that contributes to the conventional technology of the technical solutions of the present application or a part or whole of the technical solutions may be expressed in the form of a software product. The computer software product is stored in a storage medium, and includes several instructions which enables a computer device (which may be a personal computer, a server, or a network device, and etc.) to execute all or part of the steps of the method of each embodiment of the present application. The storage medium described above includes various medium capable of storing program codes, such as a USB flash disk, a movable hard disk, a Read-Only Memory (ROM), a Random Access Memory (RAM), a magnetic disc or an optical disc.

The above description and the above embodiments only intend to illustrate the technical solutions of the present application, and are intended to limit the technical solutions of the present application. Though the present application has been described in detail with reference to the above embodiments, it should be understood by the person skilled in the art that, modifications may be made to the technical solutions described in the various embodiments described above, or equivalent substitutions may be made to a part of the technical features in the above embodiments; and all these modifications or substitutions do not make the essence of the respective technical solutions depart from the spirit and scope of the technical solutions of the embodiments of the present application.

The invention claimed is:

1. An image acquiring device for a sheet-type medium, comprising:
   an upper passage plate, mounted cooperatively with a lower passage plate, with a gap being reserved between the upper passage plate and the lower passage plate to form a passage;
   the lower passage plate, mounted cooperatively with the upper passage plate, with the gap being reserved between the lower passage plate and the upper passage plate to form the passage;
   a driving wheel, with at least two driving wheels mounted on the lower passage plate, and the driving wheels being configured to drive the sheet-type medium entered into the passage to advance along the direction of the passage;
   a floating pinch roller, with at least two floating pinch rollers mounted on the upper passage plate, and each of the floating pinch rollers being mounted cooperatively with a respective driving wheel and being tangent to the driving wheel at a tangential point, and being configured to apply a pressure to the sheet-type medium to allow the sheet-type medium to cling to the driving wheel, and
   an image collecting device, mounted between two sets of the driving wheels and the floating pinch rollers, and configured to collect an image of the sheet-type medium in a process of the sheet-type medium passing through the passage;
   wherein all tangential points are located in the passage, and are located in a plane in parallel with an advance direction of the passage.

2. The image acquiring device for the sheet-type medium according to claim 1, further comprising:
   a transparent strip, mounted between two sets of the driving wheels and the floating pinch rollers to cooperate with the image collecting device, and configured to allow the image collecting device to collect the image of the sheet-type medium by transmission collecting.

3. The image acquiring device for the sheet-type medium according to claim 2, wherein,
   a surface of a transmission position of the image collecting device is in a plane where the tangential points are located, and an upper surface of the transparent strip is in the same plane as a surface of the upper passage plate or a surface of the lower passage plate;
   or,
   the upper surface of the transparent strip is in the plane where the tangential points are located, and the surface of the transmission position of the image collecting device is in the same plane as the surface of the upper passage plate or the surface of the lower passage plate.

4. The image acquiring device for the sheet-type medium according to claim 3, wherein,
   at least three sets of the driving wheels and the floating pinch rollers are provided and comprise a set A1, a set A2, and a set A3;
   at least two sets of the image collecting devices and the transparent strips are provided and comprise a set B1, and a set B2; and
   the set A1, the set B1, the set A2, the set B2, and the set A3 are arranged in the listed sequence in the advance direction of the passage.

5. The image acquiring device for the sheet-type medium according to claim 3, wherein,
   a vertical distance between the surface of the transmission position of the image collecting device and the plane where the tangential points are located is in a preset distance interval;
   the distance interval is obtained according to a distance-gray scale value curve and a change interval of a gray scale value;
   the distance-gray scale value curve records a corresponding relationship between a gray scale value of a collected image and a distance from the surface of the transmission position of the image collecting device to a surface of the sheet-type medium; and
   the change interval of the gray scale value is a change range of the gray scale value of the image within which the analysis processing is not affected.

6. The image acquiring device for the sheet-type medium according to claim 1, further comprising:
   a synchronous belt, mounted on the driving wheels and configured to drive the driving wheels to rotate at the same rotational speed.

7. The image acquiring device for the sheet-type medium according to claim 1, further comprising:
   a magnetic sensor, mounted on the lower passage plate, having a sensing surface located in a plane where the tangential points are located, and configured to sense a change of position of the sheet-type medium and generate a corresponding electrical signal.

8. The image acquiring device for the sheet-type medium according to claim 7, wherein the sensing surface is tangent to lower ends of a plurality of floating pinch rollers.

9. The image acquiring device for the sheet-type medium according to claim 1, further comprising:
   a thickness sensing device, mounted on the upper passage plate and the lower passage plate, and located at a tail end of the passage in the advance direction of the passage, and configured to measure a thickness of the sheet-type medium.

10. The image acquiring device for the sheet-type medium according to claim 9, wherein,
    a plurality of sets of the driving wheels and the floating pinch rollers are provided in the thickness sensing device; and
    the sheet-type medium is configured to pass through the thickness sensing device at a position between through the plurality of sets of the driving wheels and the floating pinch rollers.

* * * * *